United States Patent [19]

Moroto et al.

[11] Patent Number: 5,735,376

[45] Date of Patent: Apr. 7, 1998

[54] AUTOMATIC TRANSMISSION FOR VEHICLES

[75] Inventors: Shuzo Moroto, Nagoya; Takao Taniguchi; Shoichi Miyagawa, both of Okazaki; Kazumasa Tsukamoto, Toyota; Masahiro Hayabuchi; Masaaki Nishida, both of Anjo; Satoru Kasuya, Hekinan; Yutaka Teraoka, Anjo, all of Japan

[73] Assignee: Aisin Aw Co., Ltd., Japan

[21] Appl. No.: 621,033

[22] Filed: Mar. 22, 1996

[30] Foreign Application Priority Data

Mar. 24, 1995 [JP] Japan ................. 7-090143
Sep. 25, 1995 [JP] Japan ................. 7-269039

[51] Int. Cl.$^6$ ................................. F16D 25/0638
[52] U.S. Cl. ..................... 192/85 CA; 192/110 B; 192/113.34; 192/113.5; 475/269
[58] Field of Search .................. 192/85 CA, 110 B, 192/113.34, 113.5; 475/269; 384/368, 322

[56] References Cited

U.S. PATENT DOCUMENTS

| | | | |
|---|---|---|---|
| 1,227,141 | 5/1917 | Hoover | 384/368 |
| 3,038,575 | 6/1962 | Hansen | 192/85 CA |
| 3,251,247 | 5/1966 | Lamburn . | |
| 3,613,848 | 10/1971 | Reiff . | |
| 3,805,933 | 4/1974 | Pray | 192/85 CA |
| 4,226,319 | 10/1980 | Euler et al. | 192/85 CA |
| 4,450,944 | 5/1984 | Fujioka et al. | 192/113.34 X |
| 4,646,889 | 3/1987 | Hoffman et al. | 192/113.34 X |
| 4,922,789 | 5/1990 | Aono et al. | 192/85 CA X |
| 5,234,090 | 8/1993 | Haka | 192/70.25 |

FOREIGN PATENT DOCUMENTS

| | | |
|---|---|---|
| 3705052 | 2/1987 | Germany . |
| 2290731 | 11/1990 | Japan . |
| 4285331 | 10/1992 | Japan . |
| 5321974 | 12/1993 | Japan . |

OTHER PUBLICATIONS

Konstruktion, vol. 40, No. 8, Aug. 1988.
Patent Abstracts of Japan, vol. 013, No. 289 5 Jul. 1989.
Organi Di Transmissione, vol. 21, No. 4 Apr. 1990, pp. 103–105.

*Primary Examiner*—Rodney H. Bonck
*Attorney, Agent, or Firm*—Lorusso & Loud

[57] ABSTRACT

A vehicular automatic transmission, for establishing a plurality of forward gear stages, includes: a transmission case; an input shaft; a transmission mechanism connected to the input shaft and including a plurality of transmission elements; an output shaft connected to the transmission mechanism; a clutch drivably connecting any one of the input shaft and the transmission elements individually; and a hydraulic servo for applying the clutch responsive to an oil pressure. The transmission case encloses the transmission mechanism, the clutch and the hydraulic servo, and includes axial end walls, on one of which is formed a stationary cylinder for the hydraulic servo. A piston is slidably mounted in the cylinder and together with the cylinder, defines an oil chamber for receipt of the actuating oil pressure. A bearing is arranged between the piston and the clutch for transmitting the thrust force from the piston to the clutch, while allowing relative rotation between the piston and the clutch. The clutch includes a hub with an outer cylindrical surface splined to a friction plate assembly and a rim radially spaced from the hub with the friction plate assembly splined to its inner cylindrical surface. The input shaft is connected to the hub whereas one of the transmission elements is connected to the rim.

7 Claims, 10 Drawing Sheets

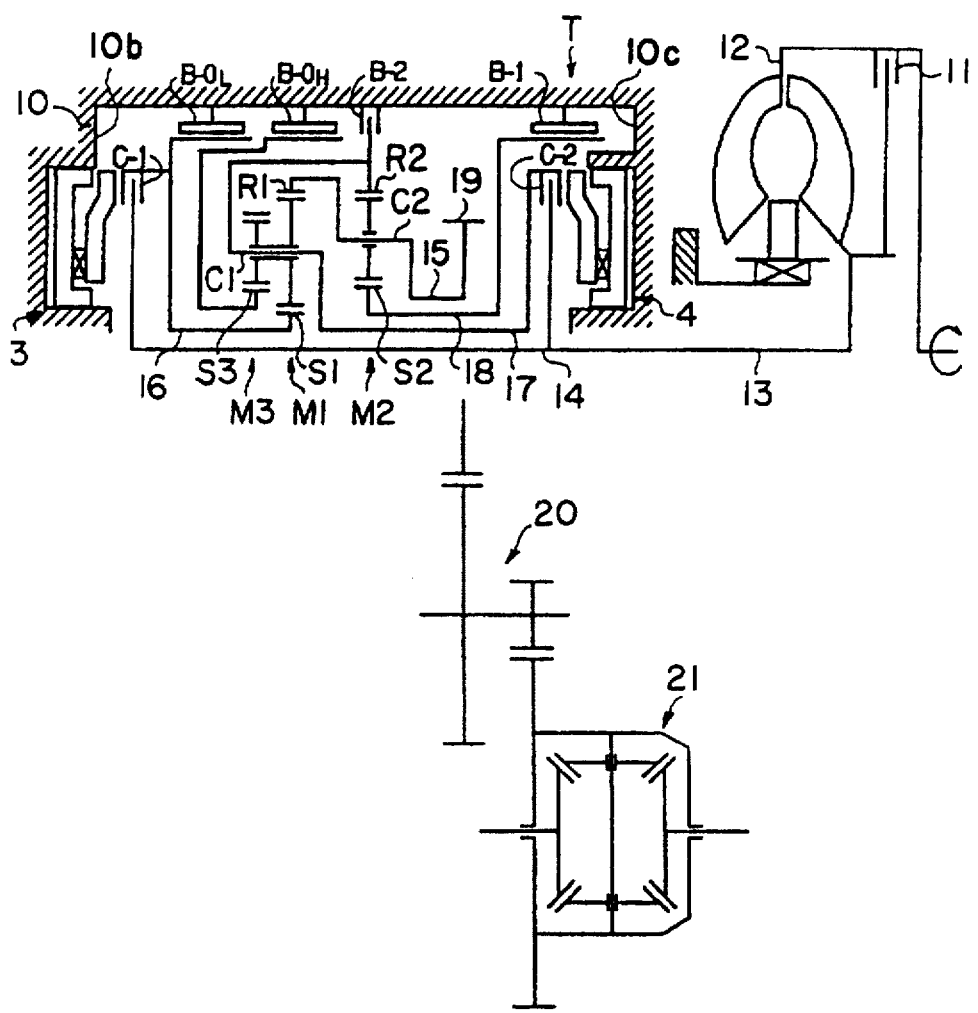

|     | C-1 | C-2 | B-0 | B-1 | B-2 |
|-----|-----|-----|-----|-----|-----|
| P   |     |     |     |     |     |
| REV | O   |     |     |     | O   |
| N   | O   |     |     |     |     |
| 1ST | O   |     |     | O   |     |
| 2ND |     | O   |     | O   |     |
| 3RD | O   | O   |     |     |     |
| 4TH |     | O   | O   |     |     |

|   | C-1 | C-2 | B-0L | B-0H | B-1 | B-2 |
|---|---|---|---|---|---|---|
| P |  |  |  |  |  |  |
| REV | ○ |  |  |  |  | ○ |
| N |  |  |  |  |  |  |
| 1ST | ○ |  |  |  | ○ |  |
| 2ND |  | ○ |  |  | ○ |  |
| 3RD | ○ | ○ |  |  |  |  |
| 4TH |  | ○ | ○ |  |  |  |
| 5TH |  | ○ |  | ○ |  |  |

AUTOMATIC TRANSMISSION FOR VEHICLES

BACKGROUND OF THE INVENTION

1. Field of the Invention

The present invention relates to an automatic transmission for a vehicle and, more particularly, to a vehicular automatic transmission having a gear train construction for switching power transmission paths by a clutch which disconnects the hydraulic servos from the rotary elements of the transmission.

2. Description of the Prior Art

In the prior art, a multiple disk clutch is employed in the gear train of an automatic transmission for selectively connecting the rotary members of a transmission mechanism to each other so as to transmit or block the transmission of power. Such a multiple disk clutch has a friction plate assembly consisting of a plurality of friction members held against rotation by a splined engagement between the outer circumference of the hub and their inner peripheries, and, alternating therewith, a plurality of separator plates held against rotation by a splined engagement between their outer circumferences and the inner circumference of the clutch drum. The hydraulic servo for operating the multiple disk clutch has an oil chamber defined by a cylinder, which is disposed at the side of the clutch drum fixed to a rotary member and which is integral with the drum, and a piston which is slidably arranged within the cylinder. Oil pressure within the oil chamber forces the piston against the friction plate assembly to apply the clutch. The hydraulic servo rotates together with the clutch drum. Such a clutch is disclosed, for example, in Japanese Laid-Open Application No. 321947/1993.

In a automatic transmission, the rotary members undergoing a rotational change at the time of a shift create an inertial force (or inertia torque) which is determined by the rotational change and by the weight of the rotary members, which force causes fluctuation of the output shaft torque and a shift shock. In the aforementioned prior art, the clutch drum containing the hydraulic servos is fixed to a rotary member, thereby adding to the weight of the rotary member, increasing the inertial force and thereby increasing the aforementioned shift shock. Moreover, when the hydraulic servo of the clutch is integrated with the clutch drum as in the prior art, a centrifugal oil pressure is generated by the centrifugal force acting on the oil in the cylinder so that the piston receives an oil pressure which is increased by the centrifugal oil pressure and, therefore, is greater than the oil pressure output from the hydraulic control system. For these reasons, an oil chamber for offsetting the centrifugal oil pressure is disclosed in Japanese Laid-Open Application No. 321947/1993. However, this provision of a centrifugal oil pressure offsetting chamber is not entirely satisfactory for reducing shift shock because it further adds to the weight of the rotary members. The provision of the centrifugal oil pressure offsetting chamber creates another problem in that the size of the system is enlarged.

In the prior art shown in FIG. 16, the input shaft is connected to the rim at the outer circumferential side of the clutch, as in the case in which the cylinder is formed in the clutch drum. Specifically, as shown in FIG. 16, for the purpose of reducing the axial length of the transmission, the stationary cylinder of the hydraulic servo is formed in the axial end wall portion of the case, and the clutch is applied through an apply tube which extends through a connection member d, connecting an input shaft b and a circumferential rim c. The input shaft b extends inwardly from the side wall a and, as a result, in operating the apply tube e having a comb-shaped arrangement, the thrust force from a piston f is not transmitted uniformly around the circumference of the clutch, thus producing an uneven force on the bearings. On the other hand, when the clutch is uniformly engaged around its circumference, as shown in FIG. 17, so as to prevent uneven bearing pressure, a center support g for forming the cylinder is required, enlarging the axial dimension. In both of the prior art structures shown in FIGS. 16 and 17 a stationary type cylinder is in or adjacent the side wall which receives the input shaft b. However, in the case where the input shaft is introduced from one axial end side wall and extends to the other axial end side wall, similar problems also arise when the stationary cylinder is formed in the other side wall.

In the aforementioned stationary cylinder type hydraulic servo, moreover, the piston thrust force and the reaction force cannot be balanced in the clutch drum, unlike the case of conventional clutch drum structure wherein the clutch drum has a rotary type cylinder.

It is desirable that the friction plates receive a continuous feed of lubricating oil, so as to prevent heat generation, regardless of whether applied or released, and to provide stable friction characteristics at the time of applying or releasing the clutch. In the clutch drum type of the prior art equipped with a hydraulic servo, however, most of the elements of the transmission mechanism stand still when the vehicle is stopped and when disengaged in the established gear stage. In the prior art construction wherein the rim side is connected to the input shaft whereas the hub side is connected to one of the transmission elements, the hub when standing still obstructs the feed of the lubricating oil from the radially inner side of the hub to the friction plates. Thus, heat generation and unstable friction characteristics necessarily result when the clutch drum is connected to the input shaft.

In the case of the rotary cylinder type clutch drum of the prior art, the reaction force is borne solely by the clutch drum, but no external force is applied to the clutch, so that the stroke of the piston at the time of applying the clutch is substantially constant. In the case of the stationary cylinder, in contrast, the reaction force is borne through another member such as the transmission mechanism or the input shaft so that various forces other than the thrust force of the hydraulic servo, such as the thrust force of the helical gear, are applied to the clutch. If these forces are active at the time of releasing the clutch, the clearances between the friction plates of the clutch will change with the situation at that time so that the engaging characteristics of the clutch will change with the change in the clearances when the clutch is applied. This will invite not only lower controllability of the oil pressure at the time of shifting time but also shift shock.

The prior art also discloses a clutch hydraulic servo which does not rotate, e.g. Japanese Laid-Open Application Nos. 290731/1990 and 285331/1992. The former discloses a clutch designed for connecting the differential mechanism and the output shaft for torque distribution between the front and rear wheels in the center differential unit, and the latter discloses a clutch for connecting the output gear of the power extraction unit (or power takeoff unit) to the output shaft. If a clutch having a non-rotatable hydraulic servo is provided for the final power takeoff, which sees no drastic change in rotation at the time of shifting, important objectives cannot be achieved, i.e. the reduction of shift shock by reducing the inertial torque and retention of good oil pressure control characteristics due to the absence of centrifugal oil pressure.

SUMMARY OF THE INVENTION

It is, therefore, a first object of the present invention to provide a vehicular automatic transmission in which shift shocks are reduced by providing a stationary type hydraulic servo portion separated from the rotary members to reduce the inertial force of the rotary members and to reduce size and weight by eliminating as unnecessary the centrifugal oil pressure offsetting chamber in the clutch hydraulic servo.

A second object of the present invention is to prevent the uneven bearing pressure described in connection with FIGS. 16 and 17, while shortening the axial dimension, by a unique arrangement of the hydraulic servo, in a case side wall, for the input clutch of the transmission mechanism.

A third object of the present invention is to prevent the reaction resulting from the thrust force of the hydraulic servo from acting upon the transmission mechanism, in an arrangement wherein the input clutch is actuated by a stationary cylinder type hydraulic servo.

It is, therefore, a fourth object of the present invention to provide a clutch construction allowing the stationary cylinder type hydraulic servo to feed the friction plates with lubricating oil at all times by connecting the hub to the input shaft.

Incidentally, it is advantageous that the thrust bearing radius of gyration be maintained so that the relative rotation may be reduced to allow a high maximum r.p.m. On the other hand, the clutch is desired to have a diameter as large as possible for retaining frictional engagement. In case, however, the friction plate assembly receives thrust through a thrust bearing, the result is conflicting demands for a small diameter on one hand and a large diameter on the other hand, in the case where a stationary cylinder type hydraulic servo is used. It is, therefore, a fifth object of the present invention to provide a construction which can satisfy such contradictory demands for the thrust bearing.

A sixth object of the present invention is to reduce the size of the system by a return spring arrangement utilizing the radially inward side of a clutch of relatively large diameter.

A seventh object of the present invention is to maintain the clearances between the friction plates of a clutch having a stationary cylinder type hydraulic servo at a constant, so as to minimize change in the engaging characteristics of the clutch and shift shock.

An eighth object of the present invention is to provide for stable lubrication of the bearing which cooperates with the hydraulic servo in the aforementioned clutch construction.

The present invention achieves the aforementioned objectives by providing a vehicular automatic transmission for establishing a plurality of forward gear stages, which transmission includes: a transmission case; an input shaft; a transmission mechanism connected to the input shaft and including a plurality of transmission elements; an output shaft connected to the transmission mechanism; a clutch drivably connecting any two of the input shaft and the transmission elements to each other; and a hydraulic servo for applying the clutch responsive to an oil pressure. The hydraulic servo, in turn, includes: a stationary type cylinder formed in the transmission case; a piston slidably arranged in the cylinder, and defining, together with the cylinder, an oil chamber for receiving the oil pressure; and a thrust bearing arranged between the piston and the clutch for transmitting the thrust forces, as generated by piston movement responsive to the oil pressure fed to the oil chamber, while allowing relative rotation between the piston and the clutch.

In at least one preferred embodiment of the present invention the subject clutch operates to connect the input shaft and the transmission elements, individually, in a driving manner. In this preferred embodiment, the hydraulic servo includes: a stationary type cylinder formed in at least one of the two side end walls of the transmission case; a piston slidably arranged in the cylinder, and defining, together with the cylinder, an oil chamber for receiving oil pressure; and a thrust bearing arranged between the piston and the clutch for transmitting the thrust force of the piston, while allowing relative rotation between the piston and the clutch. The clutch includes a hub with a friction plate assembly splined to its outer surface, and a rim radially spaced from the hub with the friction plate assembly splined to its inner surface. The input shaft is connected to the hub whereas one of the transmission elements is connected to the rim. The input shaft is connected to the hub which forms the inner circumference of the clutch so that the clutch is actuated directly by the hydraulic servo disposed at the end of transmission case, to provide uniformity of bearing pressure and to shorten the axial size.

In another preferred embodiment, the transmission mechanism includes a flange portion arranged adjacent to the clutch for transmitting the thrust force, i.e. the force from the piston to the clutch, to the input shaft, and wherein a second bearing for regulating the axial movement of the input shaft is interposed between the input shaft and the side wall opposite that where the clutch is located. The reaction force is transmitted to one side wall whereas the thrust force from the hydraulic servo is transmitted through the clutch, the flange portion and the input shaft to the other side wall so that axial forces are received at the two side walls of the transmission case without exerting a thrust force upon the remaining transmission mechanism. As a result, the members composing the transmission mechanism need not bear the reaction force so that the transmission mechanism can be made more compact.

The clutch hub preferably has an oil passage therethrough providing communication between the inner and outer cylindrical surfaces of the hub, to introduce the lubricating oil received from the radially inner side of the hub, to the friction plate assembly. In this preferred embodiment the hub of the clutch will always rotate with the input shaft so that the oil, as fed from the radially inner side of the clutch, is stably fed via the through hole oil passage in the hub, to the friction plate assembly, by centrifugal force, to thereby improve the lubricating performance and the cooling effect.

In yet another preferred embodiment the hydraulic servo includes a thrust member in the form of an annular disk interposed between the clutch and the bearing, and wherein the thrust member abuts the bearing at its radially inward side and abuts the clutch at its radially outward side. This arrangement allows the bearing and the clutch to be arranged at optimum positions, as required.

According to another aspect of the present invention, the hydraulic servo includes return springs acting on the piston in opposition to the oil pressure fed to the oil chamber, with the return springs being arranged in a circle coaxial with and radially inward of the clutch. This arrangement provides a compact structure by the radial overlap between the return springs and the clutch.

In yet another preferred embodiment of the present invention either the input shaft or the transmission mechanism is provided with a reaction member for transmitting the thrust force from the hydraulic servo through the clutch to the transmission case, and the hydraulic servo includes return springs for applying a force to the piston in opposition to the oil pressure fed to the oil chamber. A thrust member is interposed between the clutch and the thrust bearing, with the return springs having one end axially abutting against the thrust member, its opposite ends abutting the reaction member. The return springs hold constant the clearances within the friction plate assembly against the thrust force coming from the outside at the time of releasing the clutch. As a result, it is possible to maintain controllability of the clutch and to prevent shift shock, which might otherwise occur due to loss of the clearances.

In yet another preferred embodiment the hydraulic servo includes a thrust member interposed between the clutch and the bearing, wherein the thrust member does not rotate relative to the input but, rather, axially slides thereon. The bearing includes a pair of races abutting against the piston and the thrust member, respectively, and the race abutting against the thrust member has a lubricating oil receiving portion extending axially and radially inward of the thrust member. Thus, the thrust member always rotates with the input shaft. The race of the bearing at the side of the thrust member abuts against the thrust member so that it also rotates with the input shaft at all times. As a result, oil is stably fed at all times to the bearing, as it is fed to the lubrication oil receiving portion of the race, by the centrifugal force accompanying the rotation of the race.

Thus, the present invention provides a stationary cylinder type hydraulic servo construction, by which a clutch of the automatic transmission is applied, wherein the weight of the rotary members is reduced to lighten the shift shock due to the inertial torque. Moreover, the oil chamber of the hydraulic servo is formed in an end of the transmission case so that the size of the system can be reduced as compared to the prior art construction including a centrifugal oil pressure offsetting chamber. The present invention succeeds in reducing the inertial torque, while avoiding the adverse affect on oil pressure control characteristics at the time of a shift due to centrifugal oil pressure.

BRIEF DESCRIPTION OF THE DRAWINGS

Other objects, features and advantages of the present invention will become apparent from the following description to be made with reference to the accompanying drawings, in which:

FIG. 3 is a skeletal diagram showing the entire construction of a vehicular automatic transmission according to a second embodiment of the present invention;

FIG. 4 is an operational table for the embodiment of FIG. 3;

DESCRIPTION OF THE PREFERRED EMBODIMENTS

Figures 1, 2:
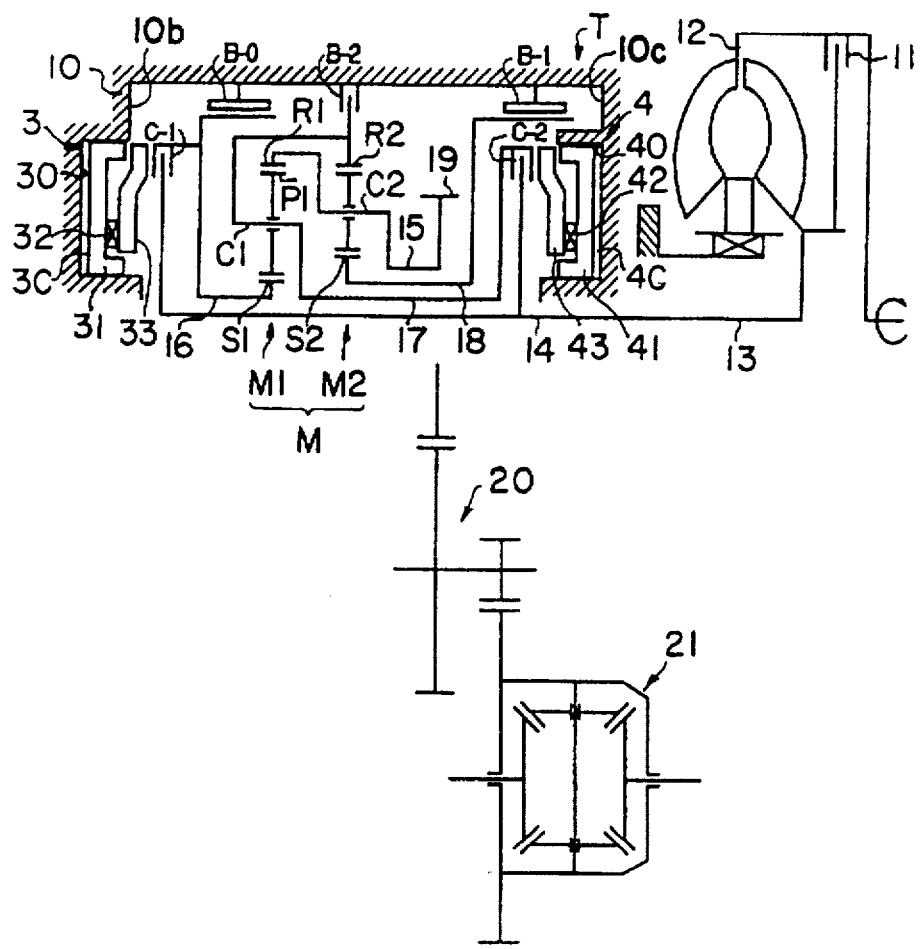
FIG. 1 is a skeletal diagram showing the entire construction of a vehicular automatic transmission according to a first embodiment of the present invention.
FIG. 2 is an operational table for the embodiment of FIG. 1.

A first embodiment of the present invention is shown in FIG. 1 as including an automatic transmission T for a vehicle which, in turn, includes a transmission case 10, an input shaft 14 and a transmission mechanism M connected to the input shaft 14. The transmission mechanism M is composed of gear units M1 and M2 having a plurality of transmission elements (as will be hereinafter described). An output shaft 15 is connected to the transmission mechanism M and clutches C-1 and C-2 connect together the input shaft 14 and any two selected transmission elements to establish a given gear stage. In this first embodiment C-1 connects the input shaft 14 to the sun gear S1 and C-2 drivably connects the input shaft 14 to a carrier C1). Hydraulic servos 3 and 4 operate the clutches C-1 and C-2, respectively, responsive to oil pressure, to establish a plurality of (e.g., four in the present embodiment forward gear stages.

The transmission case 10 houses the transmission mechanism M, the paired clutches C-1 and C-2, the paired hydraulic servos 3 and 4, and the other related mechanisms, as will be described in detail hereinafter, and includes side walls 10a and 10b at its two axial ends.

The hydraulic servos 3 and 4 include, respectively, cylinders 30 and 40, which are formed on the respective side walls 10a and 10b of the transmission case 10. Pistons 31 and 41 are slidably mounted in the cylinders 30 and 40 and, in combination with the cylinders 30 and 40, define oil chambers 3C and 4C for receiving oil pressure. Bearings 32 and 42 are provided between the pistons 31 and 41 and the clutches C-1 and C-2 to allow relative rotations between the pistons 31 and 41 and the clutches C-1 and C-2 and to transmit the thrust forces from the pistons 31 and 41 to the clutches C-1 and C-1, as the oil pressure is supplied to the oil chambers 3C and 4C.

As indicated in FIG. 2, in the present embodiment, the clutch C-1 is applied when the first speed (1ST) and the third speed (3RD), i.e. two of the four speeds in this embodiment, forward gear stages are to be established, and is released upon shifting to the second speed (2ND) and the fourth speed (4TH). The clutch C-2 is applied in establishing the second to fourth speeds and is released at the time of shifting to the first speed.

Figure 11:
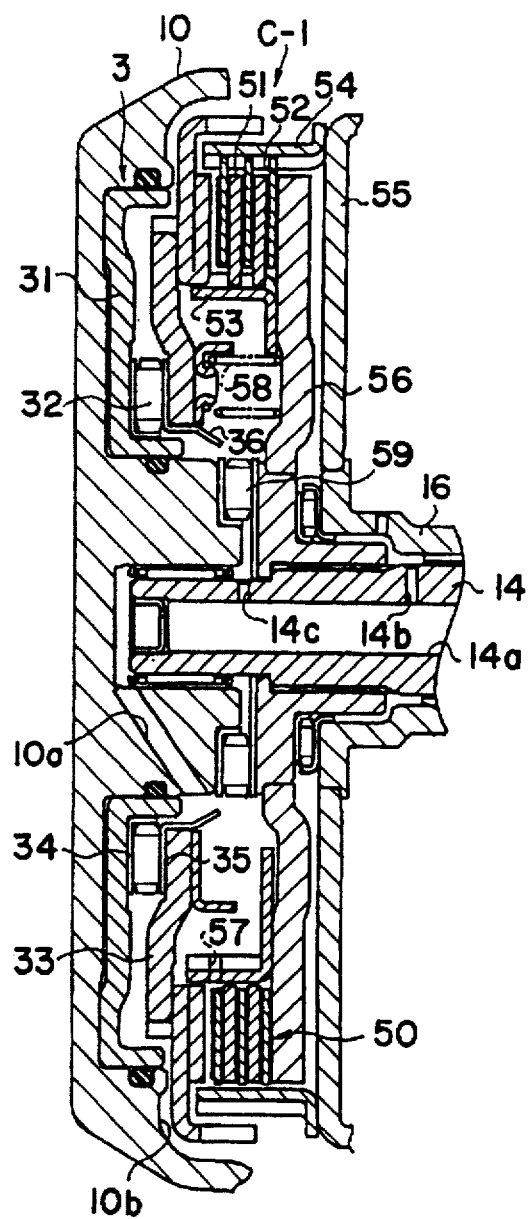
FIG. 11 is a partial cross-sectional view of the first embodiment (FIG. 1) showing a portion of one clutch and its hydraulic servo.

As shown in detail in FIG. 11, the clutch C1 includes a hub 53 having an outer circumference to which a plurality of friction members 51 of friction plate assembly 50 are splined. A plurality of separator plates 52 are arranged axially alternating with the friction members 51. A rim 54, arranged radially outward of the hub 53, has an inner circumference to which the separator plates 52 of the friction plate assembly 50 are splined. Moreover, the input shaft 14 is connected through a radial flange portion 56 to the hub 53. This radial flange portion 56 is arranged adjacent the clutch C-1 in the transmission mechanism and is splined to the input shaft 14 so as to transmit the thrust force from the piston 31 through the clutch C-1, to the input shaft 14. Moreover, the radial flange portion 56 is held in abutment against a shoulder (step) of the input shaft 14 which limits the extent of its axial movement. On the other hand, the sun gear S1 (as shown in FIG. 1), i.e., one of the transmission elements, is connected through a sun gear shaft 16 and the drum 55 of a brake B-0 to the rim 54. Moreover, the hub 53 has an oil passage 57 for introducing lubrication oil, fed from its radially inward side, to the friction plate assembly 50.

The hydraulic servo 3 has a thrust member 33 of an annular disk shape which is arranged between the clutch C-1 and the bearing 32. The thrust member 33 abuts the bearing 32 at its radially inward portion and the clutch C-1 at its radially outward portion. More specifically, the thrust member 33, near its outer circumference axially abuts against the separator plates 52 and is splined, like the friction members 51, at its inner circumference to the hub 53 connected to the input shaft 14. This splined connection prevents thrust member 33 from rotating relative to the hub but allows it to slide along a central axis. The bearing 32 has a pair of races 34 and 35 which abut against the piston 31 and the thrust member 33, respectively. The race 35, which abuts against the thrust member 33, extends axially from the inner circumference of its roller supporting face along the inner circumference of thrust member 33 and then radially inward to form a lubrication oil receiving portion 36 of a frusto-conical shape.

The hydraulic servo 3 has return springs 58 for applying a force to the piston 31 in opposition to the oil pressure from the oil chamber 3C. The thrust member 33 is splined to the input shaft 14 so as to prevent relative rotation, while allowing sliding in the axial direction. The return springs 58 are arranged radially inward of the clutch C-1 and each has one end axially abutting against the inner circumferential portion of the thrust member 33 through a spring seat. The other end of the return spring 58 abuts against the radial flange portion 56 of the input shaft 14. In FIG. 11, reference characters 14a to 14c designate oil passages in shaft 14 for feeding lubricating oil from the central passage of shaft 14 to the individual elements, and 10a designates an oil passage in the housing, but the oil passage for feeding the lubricating oil to the hydraulic servo 3 is not shown.

Figure 12:
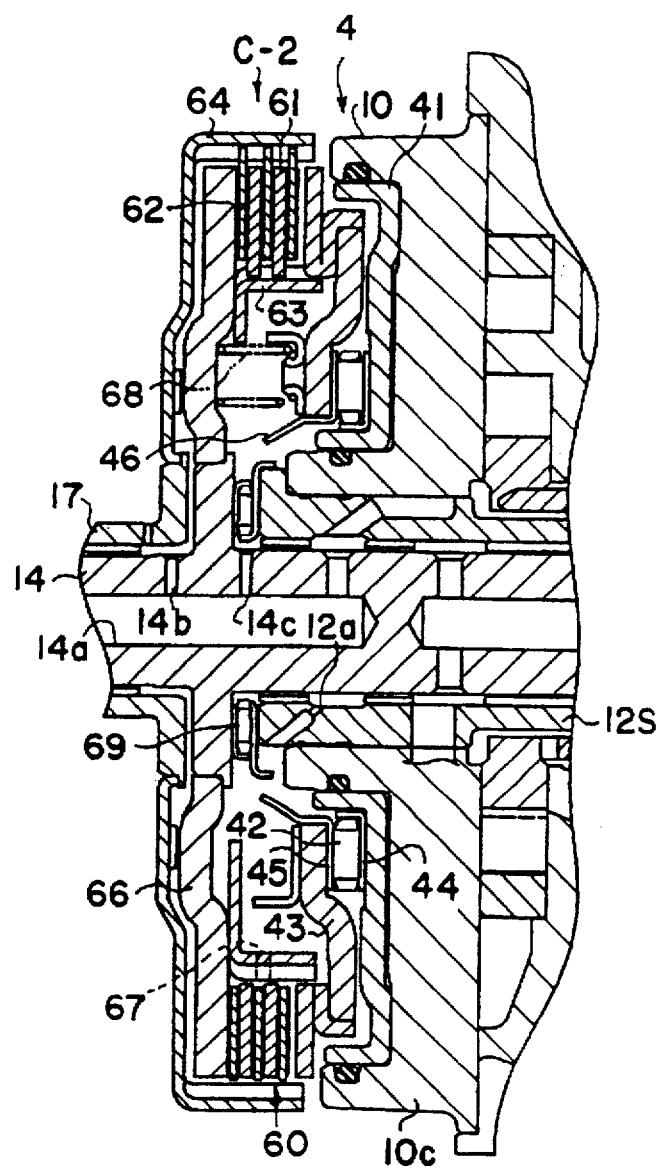
FIG. 12 is a partial cross-sectional view of the first embodiment (FIG. 1) showing a portion of another clutch and its hydraulic servo.

The clutch C-2 and its hydraulic servo 4, as shown in detail in FIG. 12, are constructed essentially like the previously described clutch C-1 and its hydraulic servo 3 so that description of features shared in common will be omitted and duplicated features are designated using similar reference characters in which only the first numerals of the individual reference characters are replaced by 4 and 6. The clutch C-2 differs only in that the input shaft 14 and the carrier C1 or one of the transmission elements are operatively connected by the action of the hydraulic servo 4 through a drum-shaped rim 64 and a carrier shaft 17. In this case, oil passage 12a corresponds to the oil passage 10a and is formed in a stator shaft 12S.

As seen with reference to FIGS. 11 and 12, second bearings 69 (as shown in FIG. 12) and 59 (as shown in FIG. 11), for regulating the axial movement of the input shaft 14, are interposed between the input shaft 14 and side walls 10b and 10c, respectively. More specifically, FIG. 11 shows that bearing 59 is located between the radial flange 56, integral with the input shaft 14, and the side wall 10b. At the opposite end of input shaft 14, as shown in FIG. 12, bearing 60 is located between the end portion of the stator shaft 12S and the side wall 10c.

Reverting to FIG. 1, here will be described the overall construction of the gear train of the aforementioned automatic transmission T. This automatic transmission T includes: a torque converter 12 having a lockup clutch 11; two planetary gear sets M1 and M2; brakes B-0 to B-2; and the aforementioned clutches C-1 and C-2. The respective ring gears R1 and R2 and carriers C2 and C1 of the two gear sets M1 and M2 are connected to each other, and the sun gear S1 and the carrier C1 of the gear set M1 are connected, as input elements through the clutches C-1 and C-2, respectively, to the input shaft 14 leading to the turbine shaft 13 of the torque converter 12. The ring gear R1 and the carrier C3, as connected to each other, are connected through the output shaft 15 to the counter drive gear 19 acting as an output element. Moreover, the sun gear S1 of the gear set M1 can be locked to the transmission case 10 by the brake B-0, and the sun gear S2 of the gear set M2 can also be locked to the transmission case 10 by the brake B-1. The ring gear R2, as connected to the carrier C1, can also be locked to the transmission case 10 by the brake B-2. In the present embodiment, more specifically: the sun gear S1 is connected to the clutch C-1 through the sun gear shaft 16 which is fitted around the input shaft 14; the carrier C1 is connected to the clutch C-2 through the carrier shaft 17 which is fitted around the input shaft 14; and the sun gear S2 is connected to the brake B-1 through a sun gear shaft 18 which is fitted around the carrier shaft 17. Brakes B-0 and B-1 are band brakes whereas the brake B-2 is a wet type multiple disk brake, although not limited thereto. Incidentally, the output gear 19 of this embodiment is connected through a counter gear 20 to a differential unit 21 to form a transmission having a horizontal construction.

As shown in FIG. 2, under the control of the not-shown hydraulic control system, the transmission thus constructed feeds oil pressure to the hydraulic servos corresponding to the individual clutches and brakes, to apply (as indicated by circle symbols) and release (as indicated by blanks) them to thereby establish the individual gear stages. Specifically, the first speed (1ST) is established when the clutch C-1 and the brake B-1 are applied. At this stage, the rotation of the input shaft 14 is transmitted through the clutch C-1 to the sun gear S1 and is output as the rotation of the carrier C2, which is decelerated by application of the brake B-1 to the sun gear S2, to the output gear 19. On the other hand, the second speed (2ND) is established when the clutch C-2 and the brake B-1 are applied. At this stage, the input, as transmitted through the clutch C-2 to the carrier shaft 17, is introduced as is through the carrier C1 to the ring gear R2, and is output as the differential rotation of the carrier C2 to the output gear 19. The carrier C2 serves as a reaction element, reacting to the braking of the sun gear S2 by the brake B-1. The third speed (3RD) is established by the direct connection of the gear set M1, as achieved by the applications of the two clutches C-1 and C-2. At this stage, the rotation of the input shaft 14 is output, as is, as the rotation of the carrier C2, to the output gear 19. The fourth speed (4TH), i.e. overdrive, is established when the clutch C-2 and the brake B-OL for fixing the sun gear S1 are applied. At this stage, the rotation of the input shaft 14 is transmitted as the rotation of the ring gear R1, which is accelerated by the revolution of the pinion gear P1 relative to the rotation of the carrier C1, from the carrier C2 to the output gear 19.

On the other hand, reverse (REV) is established when the clutch C-1 and the brake B-2 are applied. In reverse, the rotation of the ring gear R1, as decelerated and reversed from the input of the sun gear S1 by the locking of the carrier C1, is output through the carrier C2 from the output gear 19.

When the oil chambers 3C and 4C are fed with the oil pressure from the not-shown in-housing oil passage, the pistons 31 and 41 actuate the two clutches C-1 and C-2 by transmission of the thrust forces from the pistons 31 and 41 to the friction plate assemblies 50 and 60 through the bearings 32 and 42, while allowing relative rotation between these assemblies 50 and 60 and the pistons 31 and 41. The thrust force, as applied to the clutch C-1, is transmitted to the input shaft 14 through the radial flange portion 56, as shown in FIG. 11, and is received by the case side wall 10c at the opposite side through the bearing 69, as shown in FIG. 12. On the other hand, the thrust force, as applied to the clutch C-2, is transmitted to the input shaft 14 through a radial flange portion 66 and is received by the case side wall 10b at the opposite side through the bearing 59. Thus, the input shaft 14 and its two radial flange portions 56 and 66 function as reaction members. As a result, the thrust forces which apply the clutches C-1 and C-2 will not act upon the transmission mechanism M which is connected to the rims 54 and 64 of the two clutches C-1 and C-2.

Thus, according to the above-described embodiment, the hydraulic servos 3 and 4 are constructed with stationary cylinders, and the clutches C-1 and C-2 of the automatic transmission T are applied by these hydraulic servos. As a result, the weights of the sun gear shaft 16, the carrier shaft and their associated components can be reduced to lighten the shift shock caused by the inertial torque provided by shifting. Since, moreover, the oil chambers 3C and 4C of the hydraulic servos 3 and 4 are located at the ends of the transmission case 10, the size of the system is reduced as compared to the prior art arrangement in which a centrifugal oil pressure offsetting chamber is provided, while reducing the inertial torque and avoiding deterioration of the oil pressure control characteristics during shift due to centrifugal oil pressure.

Moreover, since the input shaft 14 is connected to the hubs 53 and 63, which are the radially inward sides of the clutches C-1 and C-2, respectively, the friction plate assemblies 50 and 60 of the clutches C-1 and C-2 can be pressed uniformly around their entire circumference, by the hydraulic servos 3 and 4 through the bearings 32 and 42 and the thrust members 33 and 43. Moreover, the overall axial dimension of the transmission can be shortened because the hydraulic servos 3 and 4 are incorporated into the side walls 10b and 10c.

Furthermore, the thrust force from the hydraulic servo 3 (4), as received at one side wall 10b (10c), is transmitted through the clutch C-1 (C-2), the flange portion 56 (66) and the input shaft 14 to the other side wall 10c (10b). Thus, the axial forces are borne by the two side walls 10b and 10c of the transmission case 10 so that the thrust force will not act upon the transmission mechanism M. As a result, the members composing the transmission mechanism M need not support the reaction force so that the transmission mechanism can be made compact.

Furthermore, because the hubs 53 and 63 of the clutches C-1 and C-2 rotate together with the input shaft 14 at all times, the oil, as fed from the radially inner sides of the clutches C-1 and C-2 via the lubrication oil passages 14a and 14b of the input shaft 14, is stably fed to the friction plate assemblies 50 and 60 via the through oil passages 57 and 67 of the hubs 53 and 63 to improve the lubricating and cooling.

Because the thrust members 33 and 43 abut against the bearings 32 and 42 at their radially inward portions and against the friction plate assemblies 50 and 60 of the clutches C-1 and C-2 at their radially outward portions, the bearings 32 and 42 and the clutches C-1 and C-2 can be optimally positioned.

By making use of the aforementioned construction in which the clutches C-1 and C-2 are arranged adjacent the outer circumference of the casing, they provide spaces which are formed within their inner circumferences for mounting springs 58 and 68. Thus, the automatic transmission is made compact by the radial overlap arrangement of the return springs 58 and 68 and the clutches C-1 and C-2.

Furthermore, because the return springs 58 and 68 are arranged between the reaction members 56 and 66 and the thrust members 33 and 43, respectively, when the clutches C-1 and C-2, are released springs 58, 68 maintain a constant clearance against the thrust force received from the sun gear S1 through a helical gear. In other words, the return springs 58 and 68 establish a clearance between the friction members 51 of the friction plate assemblies 50 and 60 of the clutches C-1 and C-2 and the separator plates 52, thereby maintaining controllabilities of the clutches C-1 and C-2 and avoiding shift shocks.

Furthermore, the thrust members 33 and 43 are connected to the input shaft 14 for rotation therewith. The races 35 and 45 of the bearings 32 and 42 at the sides of the thrust members 33 and 43 abut against the thrust members 33 and 43 so that they likewise rotate together with the input shaft 14 at all times. As a result, the oil, fed to the lubrication oil receiving portions 36 and 46 of the races 35 and 45, is stably fed to the bearings 32 and 42 at all times by the centrifugal force accompanying the rotation of the races 35 and 45.

Incidentally, in the above-described embodiment, the working oil can be fed directly from the (not-shown) oil port of the case 10, and no seal ring is required because the structure connecting the oil port and the oil chambers 3C and 4C does not rotate relative thereto as in the prior art. As a result, it is possible to avoid the loss in efficiency due to the drag loss of the seal ring and the oil pump capacity need not be increased to compensate for oil leakage around the seal. Since the hubs 53 and 63 at the input side are disposed radially inward of the friction plate assemblies 50 and 60, the latter can always be fed with lubrication oil, thereby improving neutral control and the durability in quick engagement and start.

In a second embodiment, as shown in FIG. 3, in order to output two low and high stages through the ring gear R1 as in the first embodiment, two planetary gear units M1 and M3 are provided. These units M1 and M3 share the pinion shaft and the carrier C1 but have different gear ratios. Sun gear S3 of unit M3 may be locked to the case 10 by band brake B-OH. In accordance with this modification, the brake corresponding to the aforementioned brake B-O is designated B-OL. Since the remaining structure is similar to that of the first embodiment, description of the duplicated structure will be omitted and similar reference numerals or letters are used in the drawings.

In this second embodiment, the forward gear stages provide five speeds, as tabulated in the operation table of FIG. 4. Specifically, the operations up to the fourth speed are identical to those of the foregoing first embodiment, and the fifth speed is established by applying the brake B-OH in place of the brake B-OL. With this construction also it is possible to obtain improvements and advantages similar to those of the first embodiment.

Figures 5, 6:
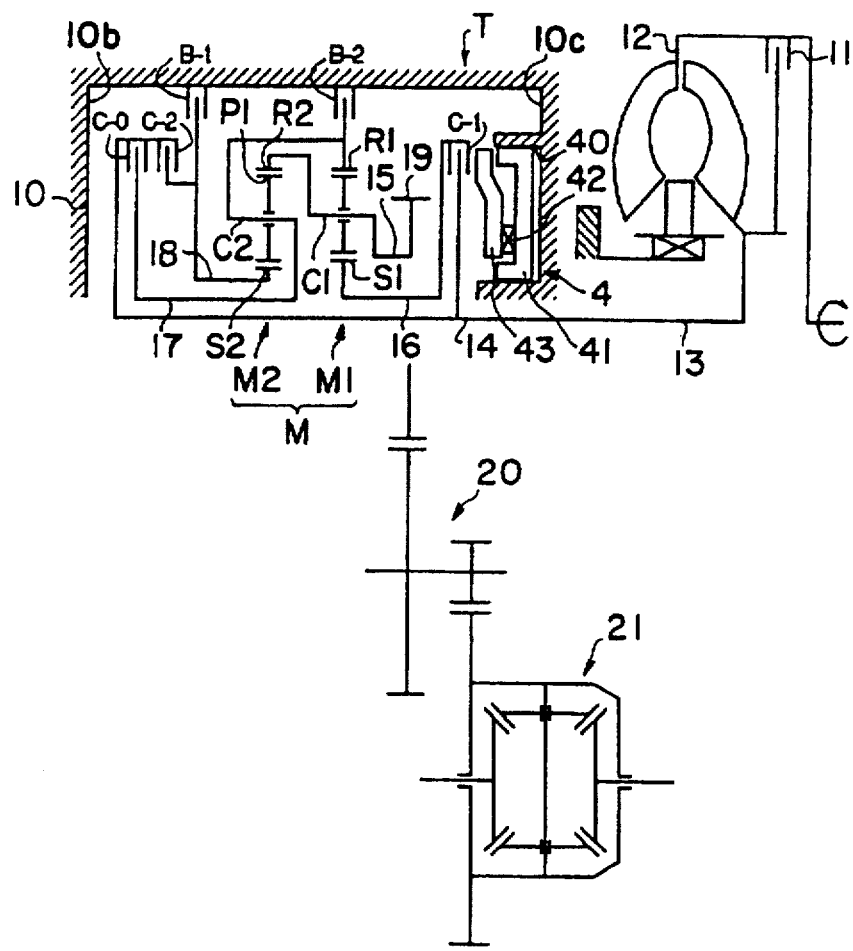
FIG. 5 is a skeletal diagram showing the entire construction of a vehicular automatic transmission according to a third embodiment of the present invention.
FIG. 6 is an operational table for the embodiment of FIG. 5.

In a third embodiment, as shown in FIG. 5, although a gear unit array similar to that of the first embodiment is adopted, the driving connections of the various transmission elements to the input shaft 14 are partially changed to provide four forward speeds utilizing the three clutches and the two brakes. This embodiment is similar to the first embodiment that the ring gears R1 and R2 and the carriers C2 and C1 of the two gear units M1 and M2 are connected to each other, but the sun gear S1 of the gear unit M1 and the carrier C2 of the gear unit M2 are connected to the input shaft 14 through the clutches C-1 and C-2, respectively, so that they may act as the input elements. The carrier C1 and the ring gear R2 which are connected to each other, are also connected to the output shaft 15. Moreover, the sun gear S2 of the gear unit M2 can be locked to the transmission case 10 by the brake B-1 and is connected to the input shaft 14 through the reverse clutch C2, and the ring gear R1, as connected to the carrier C2, can likewise be locked to the transmission case 10 by brake B-2. Because the remaining structure is similar to that of the first embodiment, its description will be omitted and the corresponding members are designated by similar reference numerals or letters.

In this third embodiment, the forward gear stages provide four speeds, as tabulated in the operation table of FIG. 6. Specifically, the first speed (1ST) is established by applying the clutch C-1 and the brake B-2, and the input of the sun gear S1 is then the decelerated output of the carrier C1 due to the fixation of the ring gear R1. The second speed (2ND) is established by applying the clutch C-1 and the brake B-1, and the input of the sun gear S1 is output as the differential rotation of the carrier C1 using the fixed sun gear S2 as the reaction element. The third speed (3RD) is established by the direct connection of the gear unit M1, achieved by applying the two clutches C-1 and C-2. At this time, the rotation of the input shaft 14 is output, as is, as the rotation of the carrier C1. The overdrive or fourth speed (4TH) is established by applying the clutch C-0 and the brake B-1 to lock the sun gear S2. At this time, the rotation of the input shaft 14 is transmitted, as the rotation of the ring gear R2 accelerated by the revolution of the pinion gear P1 from the rotation of the carrier C2, from the carrier C1 to the output gear 19. The reverse stage (REV) is established by applying the clutch C-2 and the brake B-2, and the rotation of the ring gear R2, as reversed and decelerated by the fixation of the carrier C2 from the input of the sun gear S2, is then output through the carrier C1. Thus, this third embodiment provides operational effects similar to the first embodiment.

Figures 7, 8:
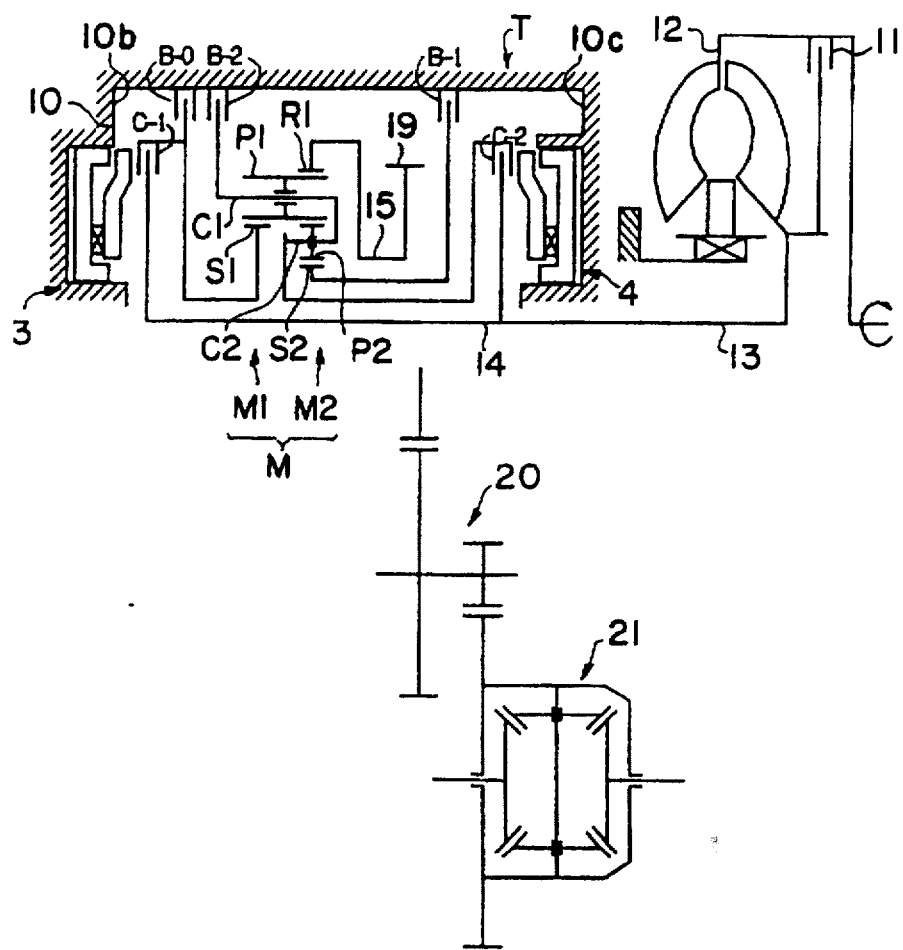
FIG. 7 is a skeletal diagram showing the overall structure of a vehicular automatic transmission according to a fourth embodiment of the present invention.
FIG. 8 is a table of the operations of the transmission of the fourth embodiment.

A fourth embodiment, as shown in FIG. 7, employs a Ravignaux gear mechanism as the transmission mechanism M, which includes: the first planetary gear set M1 composed of the sun gear S1, the ring gear R1 and the pinion gear P1 supported by and intermeshed with the carrier C1; and the second planetary gear set M2 composed of the sun gear S2, the ring gear R1, shared with the first planetary gear set M1, the pinion gear P1, shared with the first planetary gear set M1, and the pinion gear P2 meshing with the pinion gear P1 and the sun gear S2. Thus, the carrier C1 supporting the pinion gear P1 and the carrier C2 supporting the pinion gear P2 are connected to each other. The sun gear S1 is connected to and driven by the input shaft 14 through the clutch C-1 and can be locked to the case 10 by the brake B-0. The carrier C2 is connected to and driven by the input shaft 14 through the clutch C-2. The ring gear R1 is connected to the output shaft 15. The sun gear S2 can be locked to the case 10 by the brake B-1, and the carrier C1 can be fixed to the case 10 by the brake B-2. Because the remaining structure is similar to that of the first embodiment, the description thereof is omitted and the corresponding members are designated by similar reference numerals or letters.

In this fourth embodiment, the forward gear stages provide four speeds, as tabulated in the operation table of FIG. 8. The applications/releases of the individual clutches and brakes and the gear stages to be established in this embodiment are similar to those of the aforementioned first embodiment, and effects similar to those of the first embodiment can be achieved.

Figures 9, 10:
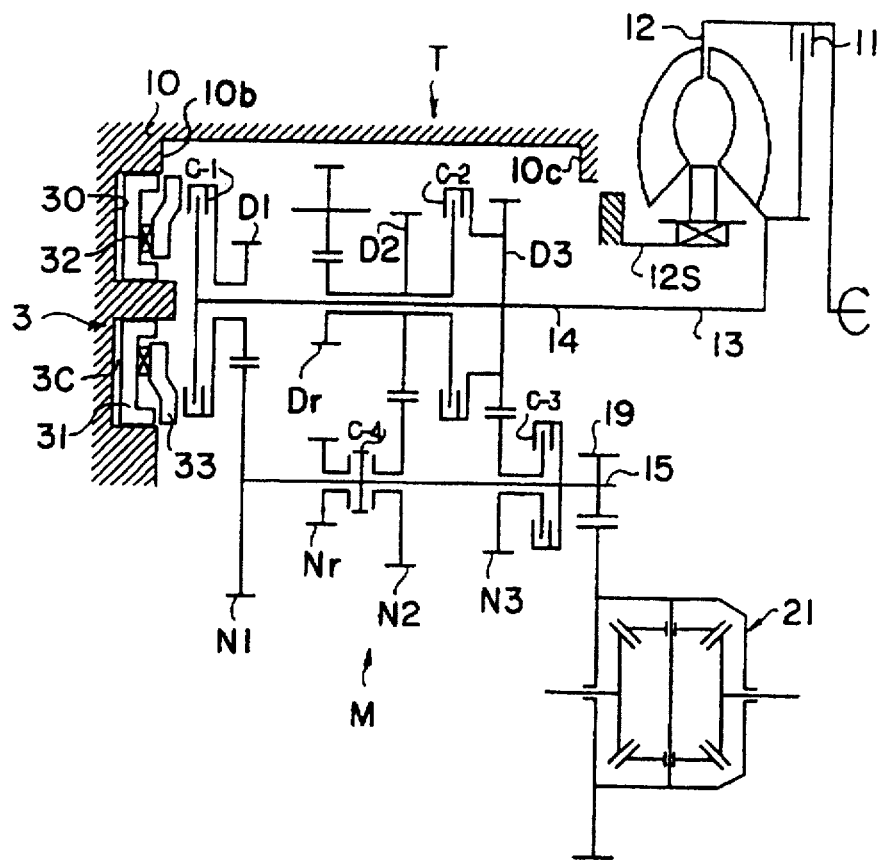
FIG. 9 is a skeletal diagram showing the entire structure of a vehicular automatic transmission according to a fifth embodiment of the present invention.
FIG. 10 is a table of the operations of the transmission of the fifth embodiment.

A fifth embodiment of the present invention, as shown in FIG. 9, is different from the foregoing four embodiments in that it has a continuously meshing type gear mechanism as the transmission mechanism M. Only a driving large gear D3, for achieving the third speed is fixed on the input shaft 14. A driving small gear D1, a driving medium gear D2 and a driving reverse gear Dr, for establishing the first and second speeds and reverse respectively, are loosely fitted on the input shaft 14. Only a driven large gear N1 meshing with the driving small gear D1, is fixed on the output shaft 15. A driven medium gear N2, meshing with the driving medium gear D2, a driven small gear N3, meshing with the driving large gear D3, and a driven reverse gear Nr, meshing with the driving reverse gear Dr, are all loosely fitted on the output shaft 15. At the input side the driving small gear D1 is connected to the input shaft 14 through the clutch C-1, and the driving medium gear D2 and the driving reverse gear Dr are connected to the input shaft 14 through the clutch C-2. At the output side, the driven small gear N3 is connected to the output shaft 15 through a clutch C-3, and the driven medium gear N2 and the driven reverse gear N4 can be selectively connected to the output shaft 15 through clutch C-4. Because the structure of this embodiment is otherwise similar to that of the first embodiment (FIG. 11), the description of the individual duplicated elements will be omitted and corresponding members are designated by similar reference numerals or letters.

In this fifth embodiment, the forward gear stages provide three speeds, as tabulated in the operation table of FIG. 10. Specifically, the first speed (1ST) is established by the connection between the input shaft 14 and the driving small gear D1, as effected by applying the clutch C-1. At this time, the rotation of the input shaft 14 is decelerated by the driving small gear D1 and the driven large gear N1 and is transmitted to the differential unit 21 from the output gear 19 of the output shaft 15. The second speed (2ND) is established by the application of the clutch C-2 and the meshing of the clutch C-4 with the driven medium gear N2 at the side of the output shaft 15. At this time, the rotation of the input shaft 14 is decelerated and output by the driving medium gear D2 and the driven medium gear N2. The third speed (3RD) is established by the application of the clutch C-3. At this time, the rotation of the input shaft 14 is accelerated and output by the driving large gear D3 at the side of the input shaft 14 and the driven small gear N3 at the side of the output shaft 15. Reverse stage (REV) is established by the meshing engagement of the clutch C-2 and the clutch C-4 with the driven reverse gear N4 at the side of the output shaft 15. Even with this construction, the inertial torque relating to the drive small gear D1 is reduced to provide advantages similar to those described in connection with the first embodiment.

Figures 13, 14:
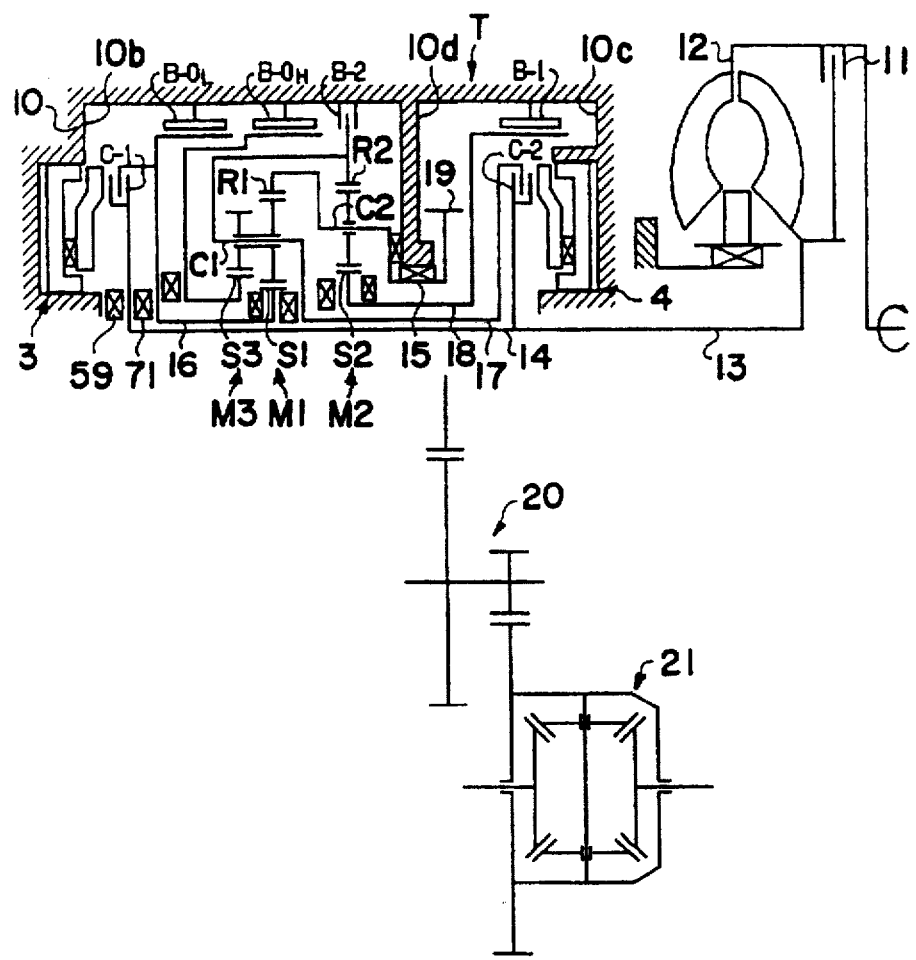
FIG. 13 is a skeletal diagram showing the overall construction of a vehicular automatic transmission according to a sixth embodiment of the present invention.
FIG. 14 is a table of the operations of the transmission of the sixth embodiment (FIG. 13)

A sixth embodiment of the present invention, as shown in FIG. 13, has a gear train substantially similar to that of the foregoing second embodiment but differs therefrom in its reaction force receiving structure. In this sixth embodiment, the thrust force received by the clutch C-1 is borne by a center support 10d, which supports the output shaft 15, through a multiple stage thrust bearing interposed in the transmission mechanism. The reason for adopting this reaction support construction can be understood from a comparison with the second embodiment. When the axial thrust forces in two directions, as applied to the individual clutches C-1 and C-2 by the common input shaft 14 in the second embodiment, are transmitted to the case side walls 10c and 10b, these clutches become difficult to control because the thrust forces influence operation of the other clutches through the input shaft 14 in a so-called "clutch-to-clutch" shift (which is effected in this embodiment in a shift from the first speed (1ST) to the second speed (2ND) or vice versa, as seen from FIG. 4) in which one clutch is applied while the other being released.

In this sixth embodiment, therefore, the thrust force applied to the clutch C-2 is likewise borne by the side wall 10b of the transmission case from the input shaft 14 through the flange portion 56 and the bearing 59, and the thrust force applied to the clutch C-1 is borne by the center support 10d, which supports the output shaft 15, through the multiple-stage thrust bearing arranged, as generally indicated in FIG. 13.

Figure 15:
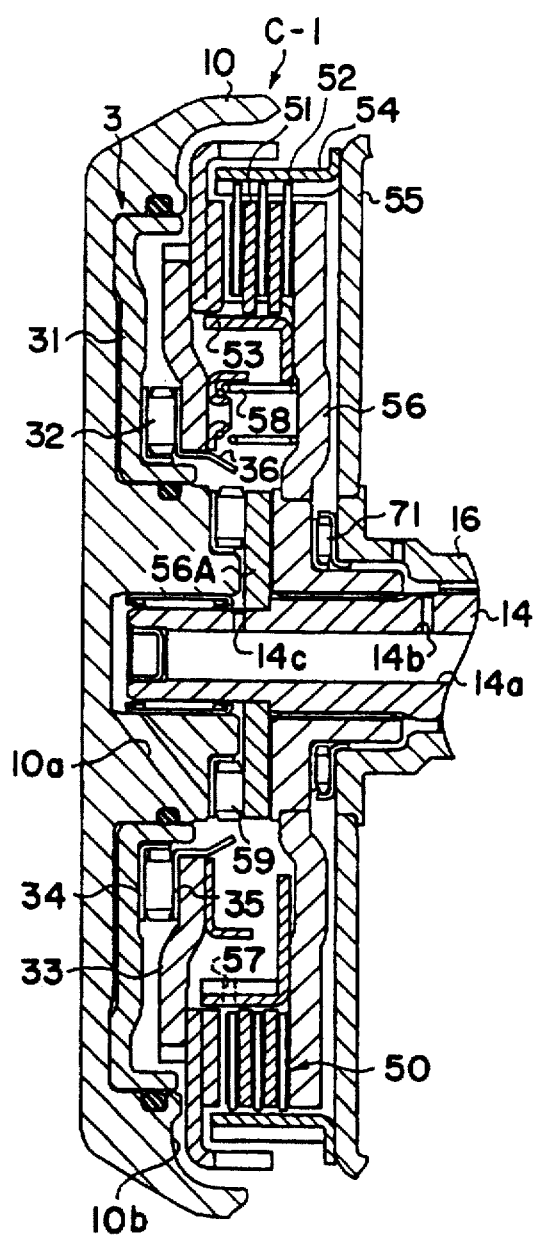
FIG. 15 is a partial cross-sectional view of the sixth embodiment (FIG. 13) showing a portion of one clutch and its hydraulic servo.
Figure 16:
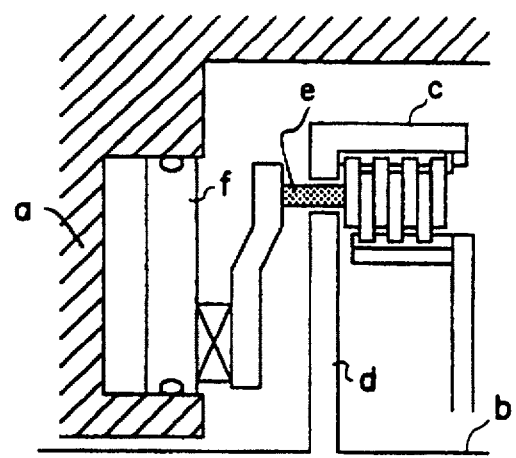
FIG. 16 is a schematic diagram of a prior art input clutch operated by a stationary cylinder type hydraulic servo.
Figure 17:
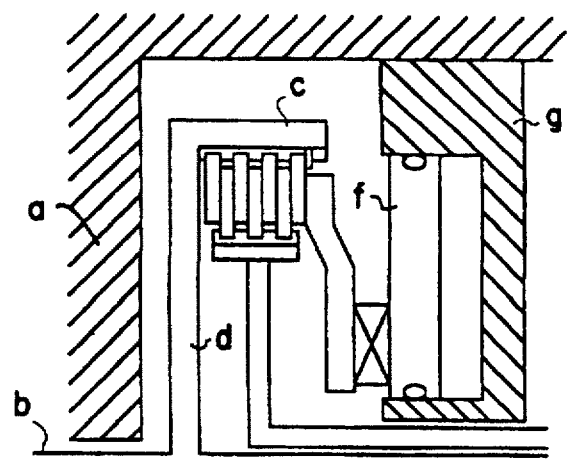
FIG. 17 is a schematic diagram of another prior art input clutch operated by a stationary cylinder type hydraulic servo.

In this sixth embodiment, the clutch C-2 is operated in a manner similar to that of the foregoing embodiments, as shown in FIG. 4. As shown in detail in FIG. 15, on the other hand, the structure which relates to the clutch C-1 is slightly different due to the difference in the mode of bearing the reaction force. Specifically, the radial flange portion 56 is splined to the input shaft 14 to prevent relative rotation therebetween while allowing movement in the axial directions and, fitted on the input shaft 14, is a flange 56A which acts as a reaction member, abutting against a step or shoulder on the input shaft 14. This flange 56A transmits the thrust force from the clutch C-2, as received by the input shaft 14, to the side wall 10b through the thrust bearing 59 which is interposed between the flange 56A and the side wall 10b of the case 10. On the other hand, the thrust force received by the clutch C-1 is transmitted, not to the aforementioned flange 56A, but to the sun gear shaft 16 from the radial flange portion 56 through a thrust bearing 71. The thrust force of clutch C-1 is ultimately borne by the center support through the individual thrust bearings which are arranged in the transmission mechanism, as shown in FIG. 13. In this embodiment, therefore, the input shaft 14, together with the flange portion 66 of the transmission mechanism M and the flange 56A, acts as the reaction member against the clutch C-2, and the transmission mechanism M, together with the flange portion 56, acts as the reaction member against the clutch C-1. Because the remaining structure is similar to that of the above-described second embodiment, the description of the duplicated individual components will be omitted and the corresponding components are designated by similar reference numerals or letters.

With this sixth embodiment, the individual gear stages are established as in the aforementioned second embodiment, as tabulated in FIG. 14. At the time of a clutch-to-clutch shift, moreover, no influence of the thrust force is exerted upon the other clutches through the input shaft 14. Thus, this sixth embodiment is especially advantageous in the control of the clutches C-1 and C-2. This embodiment also offers the advantages described in connection with the second embodiment.

Although the present invention has been described in connection with six different specific embodiments, differing in their transmission mechanisms and in their reaction force receiving structure, the present invention is not limited to the transmission mechanisms exemplified by those six embodiments, but can be variously modified within the scope of the claims and widely applied to various other transmission mechanisms. Moreover, although the foregoing individual embodiments of the present invention all have input shaft and the transmission elements which are mutually and drivably connected, the present invention can naturally be applied to the clutches for connecting the transmission elements of the transmission mechanism to each other.

What is claimed is:

1. A vehicular automatic transmission for establishing a plurality of forward gear stages, comprising: a transmission case; an input shaft; a transmission mechanism connected to said input shaft and including a plurality of transmission elements and a flange portion; an output shaft connected to said transmission mechanism; a clutch, arranged adjacent said flange portion, for drivably connecting said input shaft to one of said transmission elements; and a hydraulic servo for applying said clutch responsive to an oil pressure, wherein said transmission case encloses said transmission mechanism, said clutch and said hydraulic servo and includes two axially spaced end walls, wherein said hydraulic servo comprises:
a stationary cylinder formed on one of said end walls;
a piston slidably mounted in said cylinder, and defining, together with said cylinder, an oil chamber for receiving the oil pressure, said piston generating a thrust force responsive to receipt of the oil pressure, said thrust force being transmitted to said input shaft through said flange portion;
a first bearing arranged between said piston and said clutch for transmitting the thrust force of said piston to said clutch while allowing relative rotation between said piston and said clutch; and
a second bearing interposed between said input shaft and the other end wall opposite said one end wall for transmitting axial forces on said input shaft, to said other end wall.

2. A vehicular automatic transmission according to claim 1 wherein said clutch includes a hub having an outer cylindrical surface to which a friction plate assembly is splined, and a rim radially spaced from said hub and having an inner cylinder surface splined to said friction plate assembly, and
wherein said input shaft is connected to said hub and one of said transmission elements is connected to said rim.

3. A vehicular automatic transmission according to claim 2, wherein said hub has an oil passage providing fluid communication between said inner and outer cylindrical surfaces of said hub to provide a flow of lubricating oil from the interior of said hub to said friction plate assembly.

4. A vehicular automatic transmission according to claim 2, wherein said hydraulic servo further includes a thrust member, in the form of annular disk, interposed between said clutch and said first bearing, and wherein a radially inner portion of said thrust member faces said first bearing and a radially outer portion of said thrust member faces said clutch.

5. A vehicular automatic transmission according to claim 4.

wherein said hydraulic servo further includes return springs for biasing said piston in opposition to the force of the oil pressure fed to said oil chamber, and wherein said return springs are arranged radially inward of said clutch.

6. A vehicular automatic transmission according to claim 2, wherein said hydraulic servo further includes return springs for biasing said piston in opposition to the oil pressure fed to said oil chamber, and a thrust member interposed between said clutch and said first bearing, and wherein each of said return springs has one end axially abutting against said thrust member and a second end axially abutting against said flange portion.

7. A vehicular automatic transmission according to claim 2, wherein said hydraulic servo further includes a thrust member interposed between said clutch and said first bearing, said thrust member being connected to said input shaft in a manner preventing relative rotation therebetween but allowing said thrust member to axially slide, relative to said input shaft;

wherein said first bearing includes a pair of races abutting against said piston and said thrust member, respectively, and wherein said race abutting against said thrust member has a lubricating oil receiving portion extending axially and radially inward of said thrust member.

* * * * *